United States Patent
Mueller et al.

(10) Patent No.: US 9,612,655 B2
(45) Date of Patent: Apr. 4, 2017

(54) METHOD FOR INPUTTING A CONTROL COMMAND FOR A COMPONENT OF A MOTOR VEHICLE

(71) Applicant: AUDI AG, Ingolstadt (DE)

(72) Inventors: Ulrich Mueller, Ingolstadt (DE);
Johann Schneider, Wettstetten (DE);
Marcus Kuehne, Beilngries (DE);
Manuel Kuehner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/438,986

(22) PCT Filed: Oct. 18, 2013

(86) PCT No.: PCT/EP2013/003137
§ 371 (c)(1),
(2) Date: Apr. 28, 2015

(87) PCT Pub. No.: WO2014/067626
PCT Pub. Date: May 8, 2014

(65) Prior Publication Data
US 2015/0301591 A1 Oct. 22, 2015

(30) Foreign Application Priority Data
Oct. 31, 2012 (DE) ........................ 10 2012 110 460

(51) Int. Cl.
*G06F 3/01* (2006.01)
*B60K 35/00* (2006.01)
(Continued)

(52) U.S. Cl.
CPC .............. *G06F 3/011* (2013.01); *B60K 35/00* (2013.01); *B60K 37/06* (2013.01); *G06F 3/017* (2013.01);
(Continued)

(58) Field of Classification Search
CPC .............. G06F 3/011; G06F 2203/013; G06F 2203/014; G06F 2203/015; G06F 3/012;
(Continued)

(56) References Cited

U.S. PATENT DOCUMENTS

| | | |
|---|---|---|
| 6,353,428 B1 | 3/2002 | Maggioni et al. |
| 7,456,815 B2 | 11/2008 | Reime |

(Continued)

FOREIGN PATENT DOCUMENTS

| | | |
|---|---|---|
| CN | 101813995 | 8/2010 |
| CN | 102385237 | 3/2012 |

(Continued)

OTHER PUBLICATIONS

WIPO English language translation of the International Preliminary Report on Patentability for PCT/EP2013/003137, downloaded from WIPO website on Sep. 23, 2015, 9 pages.

(Continued)

*Primary Examiner* — Grant Sitta
(74) *Attorney, Agent, or Firm* — Staas & Halsey LLP

(57) ABSTRACT

A method inputs a control command for a component of a motor vehicle. The method involves generating an image sequence of an input object guided by a user in a specified detection region using an imaging device, detecting a change in position of the input object on the basis of the image sequence, and generating a control command for the component of the motor vehicle on the basis of the detected change in position. The imaging device employs at least one infrared-sensitive camera, and the detection region is illuminated using at least one infrared source.

20 Claims, 3 Drawing Sheets

(51) Int. Cl.
    *G06F 3/03*     (2006.01)
    *B60K 37/06*    (2006.01)
    *G06K 9/00*     (2006.01)
    *G06K 9/78*     (2006.01)
    *G06T 7/00*     (2017.01)
    *G06T 7/20*     (2017.01)
    *H04N 5/33*     (2006.01)

(52) U.S. Cl.
    CPC ....... *G06F 3/0304* (2013.01); *G06K 9/00214* (2013.01); *G06K 9/00355* (2013.01); *G06K 9/78* (2013.01); *G06T 7/0018* (2013.01); *G06T 7/0022* (2013.01); *G06T 7/0046* (2013.01); *G06T 7/20* (2013.01); *H04N 5/33* (2013.01); *B60K 2350/1052* (2013.01); *B60K 2350/2013* (2013.01); *G06T 2207/10048* (2013.01); *G06T 2207/30196* (2013.01); *G06T 2207/30268* (2013.01)

(58) Field of Classification Search
    CPC .......... G06F 3/013; G06F 3/014; G06F 3/016; G06F 3/0416; G06F 3/0418; G06F 1/3259; G06F 2203/0332; G06F 2203/0333; G06F 2203/0334; G06F 2203/0335; G06F 2200/1637; G06F 3/0346; G06F 3/038; G06F 3/04892; G06F 1/169; G06F 1/30
    USPC ....................................................... 345/156
    See application file for complete search history.

(56)         References Cited
             U.S. PATENT DOCUMENTS

| | | | |
|---|---|---|---|
| 7,925,077 B2* | 4/2011 | Woodfill | G06K 9/32 348/46 |
| 8,175,374 B2* | 5/2012 | Pinault | G06K 9/00362 382/154 |
| 8,180,114 B2 | 5/2012 | Nishihara et al. | |
| 8,249,334 B2* | 8/2012 | Berliner | G06K 9/00362 345/419 |
| 2004/0184659 A1* | 9/2004 | Bang | G06F 3/0346 382/186 |
| 2005/0025345 A1 | 2/2005 | Ohta et al. | |
| 2005/0031166 A1* | 2/2005 | Fujimura | G06K 9/00369 382/103 |
| 2005/0088407 A1* | 4/2005 | Bell | G06Q 30/02 345/156 |
| 2005/0185825 A1* | 8/2005 | Hoshino | H04N 5/265 382/103 |
| 2006/0209072 A1* | 9/2006 | Jairam | G06K 9/00362 345/440 |
| 2006/0238490 A1 | 10/2006 | Stanley et al. | |
| 2009/0096783 A1* | 4/2009 | Shpunt | G01B 11/25 345/419 |
| 2009/0262070 A1* | 10/2009 | Wilson | G06F 3/0421 345/156 |
| 2010/0195867 A1* | 8/2010 | Kipman | A63F 13/10 382/103 |
| 2010/0235786 A1* | 9/2010 | Maizels | G06F 3/011 715/810 |
| 2010/0295773 A1* | 11/2010 | Alameh | H03K 17/9631 345/156 |
| 2010/0302138 A1* | 12/2010 | Poot | G06F 3/017 345/156 |
| 2010/0303289 A1* | 12/2010 | Polzin | A63F 13/213 382/103 |
| 2010/0306716 A1* | 12/2010 | Perez | A63F 13/213 715/863 |
| 2010/0309288 A1* | 12/2010 | Stettner | G01S 17/023 348/43 |
| 2010/0328475 A1* | 12/2010 | Thomas | H04N 13/0022 348/222.1 |
| 2011/0052006 A1* | 3/2011 | Gurman | G06K 9/00201 382/103 |
| 2011/0080490 A1 | 4/2011 | Clarkson et al. | |
| 2011/0129124 A1* | 6/2011 | Givon | G06F 3/011 382/107 |
| 2011/0150271 A1* | 6/2011 | Lee | G06K 9/00335 382/103 |
| 2011/0164032 A1* | 7/2011 | Shadmi | G06F 3/017 345/419 |
| 2011/0211754 A1* | 9/2011 | Litvak | G06K 9/00375 382/165 |
| 2011/0237324 A1* | 9/2011 | Clavin | G06K 9/00369 463/29 |
| 2011/0293137 A1* | 12/2011 | Gurman | G06K 9/00201 382/103 |
| 2012/0019485 A1* | 1/2012 | Sato | G06F 3/017 345/175 |
| 2012/0056982 A1 | 3/2012 | Katz et al. | |
| 2012/0070070 A1* | 3/2012 | Litvak | G06K 9/00201 382/154 |
| 2012/0120073 A1* | 5/2012 | Haker | G06T 7/0046 345/420 |
| 2012/0127128 A1* | 5/2012 | Large | G06F 3/0425 345/175 |
| 2012/0229377 A1 | 9/2012 | Kim et al. | |
| 2012/0327125 A1* | 12/2012 | Kutliroff | G06F 3/017 345/660 |
| 2013/0141574 A1* | 6/2013 | Dalal | G06K 9/00362 348/148 |
| 2013/0157607 A1* | 6/2013 | Paek | G06F 1/1632 455/404.1 |
| 2015/0304638 A1* | 10/2015 | Cho | G01S 17/89 348/46 |

FOREIGN PATENT DOCUMENTS

| | | |
|---|---|---|
| CN | 102439538 | 5/2012 |
| DE | 19708240 | 9/1998 |
| DE | 10022321 | 11/2001 |
| DE | 10133823 | 2/2003 |
| DE | 10242890 | 3/2004 |
| DE | 20122526 | 6/2006 |
| DE | 102009023875 | 2/2010 |
| DE | 102010031801 | 1/2012 |
| WO | 2009/045861 | 4/2009 |

OTHER PUBLICATIONS

German Office Action for German Priority Patent Application No. 10 2012 110 460.3, issued May 5, 2014, 6 pages.
English language International Search Report for PCT/EP2013/003137, mailed Feb. 26, 2014, 3 pages.
PCT/EP2013/003137, Oct. 18, 2013, Ulrich Mueller et al.
DE 102012110460.3, Oct. 31, 2012, Ulrich Mueller et al.
European Office Action dated Jun. 13, 2016 from European Patent Application No. 13786625.7, 6 pages.
Chinese Office Action dated Sep. 5, 2016 from Chinese Patent Application No. 201380042805.6, 7 pages.

* cited by examiner

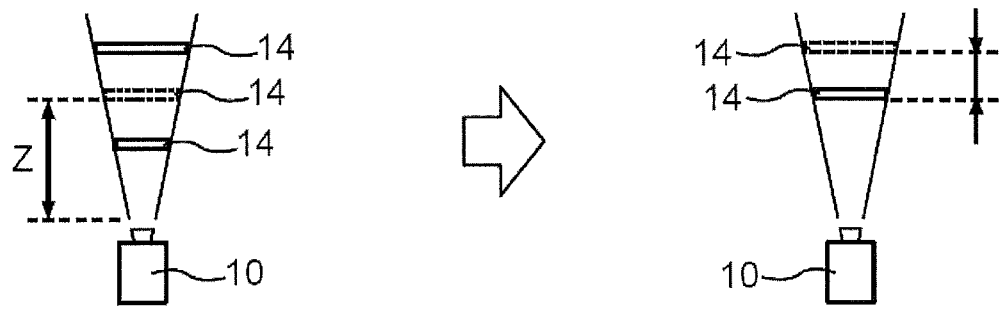
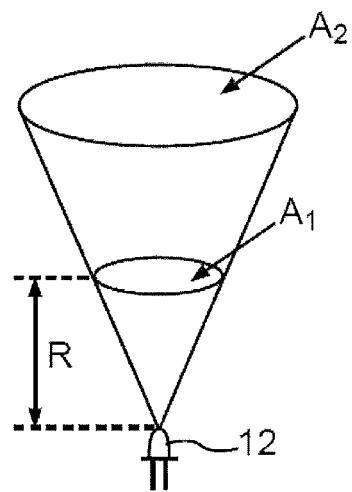
Fig.4
Fig.5

METHOD FOR INPUTTING A CONTROL COMMAND FOR A COMPONENT OF A MOTOR VEHICLE

CROSS REFERENCE TO RELATED APPLICATIONS

This application is based on and hereby claims priority to International Application No. PCT/EP2013/003137 filed on Oct. 18, 2013 and German Application No. 10 2012 110 460.3 filed on Oct. 31, 2012, the contents of which are hereby incorporated by reference.

BACKGROUND

The invention relates to a method for inputting a control command for a component of a motor vehicle.

The operation of an electronic apparatus should, particularly in a motor vehicle, be possible with the least possible distraction of the driver from driving. In this context, a man-machine interaction on the basis of gesture recognition has proven expedient. In this case, the movement of a hand of the user or of another input object in space is identified by an acquisition device, and a corresponding control command for positioning the selection element on a screen of the electronic apparatus is generated therefrom.

DE 201 22 526 discloses a method in which so-called "structured light", for example in the form of a fan beam, is used in order to produce a virtual input instrument. It is furthermore known to use stereoscopic cameras in order to determine the spatial position of a hand of a user and to use this for gesture recognition.

Known methods suffer from the disadvantage of requiring a large computing power for evaluating the images acquired. Commercially available instruments for gesture recognition are furthermore usually designed for use in the home entertainment sector. In contrast to most home applications, however, in motor vehicles there are much more complex illumination conditions, which make the evaluation of acquired images even more difficult.

SUMMARY

One possible object is to provide a method, which allows simple and reliable gesture recognition in motor vehicles.

The inventors propose a method for inputting a control command for a component of a motor vehicle, which involves:
a) generation of an image sequence of an input object guided by a user in a predetermined acquisition region by an imaging device;
b) identification of a position change of the input object on the basis of the image sequence;
c) generation of a control command to the component of the motor vehicle on the basis of the position change identified.

According to the proposal, the imaging device comprises at least one infrared-sensitive camera, and the acquisition region is illuminated with at least one infrared source.

In this way, simple and reliable gesture recognition can be achieved with little equipment outlay. In particular, the absence of stereoscopic image recognition reduces the computing outlay required, so that the image recognition can be carried out in real time. By virtue of the illumination of the acquisition region, reliable recognition is simultaneously made possible even under the difficult illumination conditions in motor vehicles. By way of example, a hand of the user may in this case be used as the input object, although the input of gestures is also possible by acquiring other objects. For example, a nod of the head or a shake of the head of the user may be identified. Objects outside the body, for example a stylus, may also be used.

It is particularly expedient here for the position change of the input object to be identified by adapting at least two images of the image sequence to a skeleton model of the input object and comparing the parameters of the skeleton model for the at least two images.

Adaptation to such a skeleton model allows rapid data reduction in the evaluation of the acquired images, so that particularly little computing power is required. Such a skeleton model may describe the shape of the input object by parameters, which describe for example the flexion angle of the individual finger joints. By varying these parameters until the skeleton model describes the same shape of the hand, as can be seen in the image, a set of parameters is obtained, namely for example the flexion angles of the finger joints, with the aid of which the evaluation of the relative position of the finger can be determined by a computer.

In another configuration, a calibration image is acquired for a predetermined position of the input object in the acquisition region in order to calibrate the skeleton model for a specific input object. This only needs to be done once, in order to be able to identify a particular object later. For example, the size of a hand of the user may thus be acquired accurately in order subsequently to determine position information from the ratio between the actual object size and the image size.

According to another aspect, the position of at least one point of the input object in a plane perpendicular to a viewing direction of the at least one camera is determined with the aid of the coordinates of the acquired point on a detector matrix of the camera. In this way, two-dimensional position information, which is directly usable on its own for the gesture recognition, is obtained particularly simply.

In order to determine the position of at least one point of the input object along an axis parallel to the viewing direction of the at least one camera, i.e. to obtain depth information, the depth position is therefore determined with the aid of an image distance of at least two points of the input object and the ratio thereof to a known object distance of the at least two points.

Further depth information can be obtained by determining the position of at least one point of the input object along the axis parallel to the viewing direction of the at least one camera with the aid of a luminous intensity of the light of the infrared source scattered back by the input object to the camera. This allows accurate distance determination in the simplest way, since the intensity of the light emitted by the infrared source—and therefore also of the light scattered back—decreases with the square of the distance. Even small distance changes therefore lead to a considerable brightness change, so that a high measurement accuracy is made possible.

In order to accommodate varying light conditions and the limited bandwidth of the camera, it is in this case expedient for an illumination power of the infrared source to be varied cyclically between at least two predetermined power values. In this way, it is reliably possible to avoid overexposures or underexposures, which may impair the distance determination. The variation of the illumination power may in this case also comprise intervals in which the infrared source does not emit any light. Since such cycling of the infrared source is carried out according to a known pattern, in this way the light component of the light source can be reliably separated in the camera signal from environmentally induced fluctuations in the ambient infrared light, so that the image recognition is simplified considerably.

For the same purpose, it is furthermore advantageous to vary an exposure time of the at least one camera cyclically between at least two predetermined values. Even in the event of strong contrasts in the image, it is thus possible to obtain full information, for example by evaluating dark regions only in images with a long exposure time and bright regions only in images with a short exposure time.

Since the geometry of the passenger compartment is furthermore known, a position ratio between the at least one point and one vehicle-fixed object with a known position acquired by the at least one camera may be determined in order to identify the position of at least one point of the input object. By setting the object in relation to known vehicle-fixed objects, additional geometrical information is obtained, which can be used in order to improve the accuracy of the position identification or to validate positions already determined.

The inventors further propose a motor vehicle having an electronic apparatus and a gesture control device with an imaging device for acquiring an operating gesture of an operating object in a passenger compartment of the motor vehicle. According to the proposal, the gesture control device is configured in order to carry out the proposed method. The advantages derive from the advantages explained with reference to the method.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4 shows a schematic representation of the determination of the z position of an object with the aid of an image size;

FIG. 5 shows a schematic representation of the relationship between the illumination strength and the distance from a light source;

DETAILED DESCRIPTION OF THE PREFERRED EMBODIMENT

Figure 1:
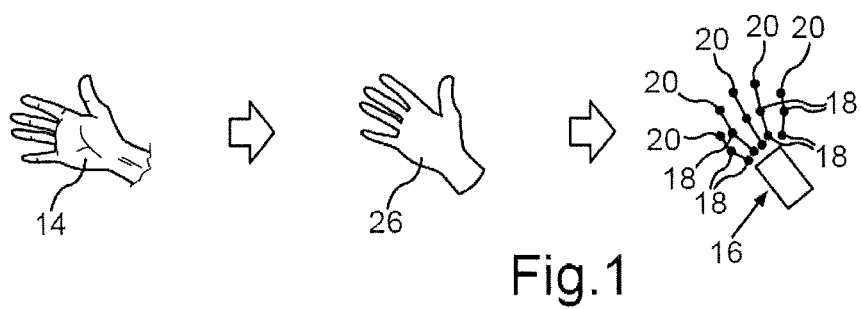
FIG. 1 shows a schematic representation of the construction of a skeleton model from an input object.
Figure 2:
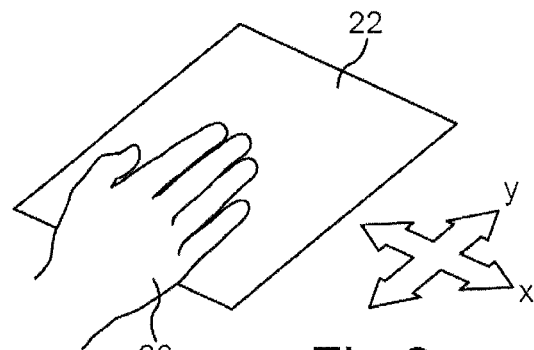
FIG. 2 shows a schematic representation of the determination of the x-y position of an object by a camera.

Reference will now be made in detail to the preferred embodiments of the present invention, examples of which are illustrated in the accompanying drawings, wherein like reference numerals refer to like elements throughout.

For the operation of motor-vehicle components, for example entertainment systems, mobile telephones, navigation equipment, or also electrical power windows, seat adjustments, air conditioning systems and the like, the attention of a driver of the motor vehicle should be distracted as little as possible from the road. For this reason, control is intended to be carried out by gesture recognition, since in this case the driver does not need to look for the operating elements, and does not possibly need to divert his attention from the road in order to do so.

To this end, the interior of the motor vehicle around the driver is recorded with at least one infrared camera 10 and this region is simultaneously illuminated with at least one infrared light source, preferably in the wavelength range of 780-870 nm. From the recorded image sequence, variations in the position of a hand 14 or of another input object can be determined, and these can in turn be assigned to particular control commands.

In order to reduce the computing outlay for the image recognition as much as possible, and to permit reliable real-time processing of the camera images, for this purpose a so-called skeleton model 16 of the hand 14 is initially constructed in a calibration phase. For this, the hand is recorded for the first time in a predetermined calibration position, so that the basic dimensions of the hand 14 can be determined. The resulting skeleton model 16 then assigns to the hand 14 the position of the individual joints 18 and of the fingertips 20, and furthermore comprises the invariant distances between respectively connected points.

Images subsequently acquired with the camera 10 for the gesture recognition can then be evaluated by adapting the skeleton model 16 to the shape of the hand 14 in the image. In this case, the possible movement space of the hand 14, which is limited by the respective flexion angle ranges of the joints, is searched for a configuration which corresponds to the image of the hand 14.

From changes in the configuration of the hand 14 and its position relative to the camera 10 in sequences of successive images, a respective gesture of the user can then be identified and the corresponding control command can be generated.

Besides the configuration of the hand 14 as defined by the flexion angles of the joints 18, it is thus also necessary to determine its position with respect to the camera 10.

Determination of the position of the hand 14 in the x-y plane, i.e. the plane perpendicular to the viewing direction of the camera 10, is in this case particularly simple. The camera 10 comprises a matrix sensor 22 having a multiplicity of pixels 24. The x-y position can therefore be determined easily from the position of the image 26 of the hand 14 on the matrix sensor 22.

Figure 3:
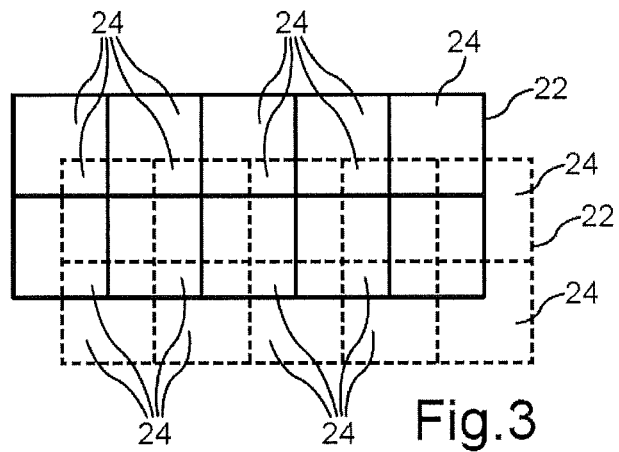
FIG. 3 shows a schematic representation of the improved determination of the x-y position of an object by two cameras.

An increased accuracy may be achieved by using two cameras 10. The cameras 10 are in this case to be oriented in such a way that the pixels 24 of the respective matrix sensors 22 are not exactly congruent, but rather have an offset from one another, as represented in FIG. 3.

Besides the x-y position, however, it is also necessary to determine the position of the hand 14 in the z direction, i.e. in the viewing direction of the camera 10. To this end, there are several possibilities.

First, the distance between the hand 14 and the camera 10 may be deduced from the size of the hand 14, known by the calibration, and the image size of the hand 14 on the matrix sensor 22 of the camera 10. As shown in FIG. 4, the image size is dependent on the distance and size of the hand relative to the camera 10, so that for example a small hand at a short distance makes the same image angle as a large hand at a larger distance. On this basis, a rough z position can be determined with an accuracy of about ±5 cm.

An improved accuracy is achieved when the hand 14 is moved relative to the z axis. From the change of the image size in successive images, it is possible—substantially on the basis of the centric transformation—to calculate the distance change of the hand with an accuracy of ±1 cm. For many gesture recognition problems, such an accuracy is already sufficient.

In order to determine the z position with the highest accuracy, the propagation characteristic of the light of the infrared source 12 may be used. Specifically, the illumination strength, i.e. the light flux per unit area, is inversely proportional to the square of the distance from the infrared source 12. This naturally also applies for the light scattered back or reflected from the hand 14 to the camera 10. It follows that even small changes in distance between the hand 14 and the infrared source 12 lead to strong luminous intensity changes in the camera image of the hand 14, on the basis of which the distance change can be determined with an accuracy of ±0.5 mm.

Figure 6:
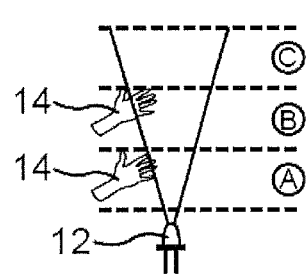
FIG. 6 shows a schematic representation of the adaptation of the luminous intensity to varying object distances.
Figure 6:
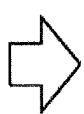
Figure 6:
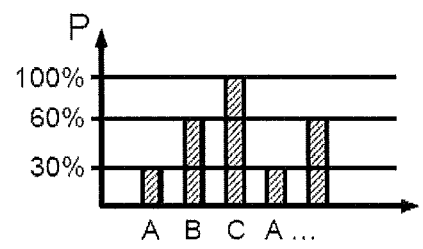

In this case, however, the problem arises that the bandwidth of the camera 10 is restricted. If, in the event of a strong luminous intensity of the infrared source, the hand 14 is located very close to the camera 10, then overdriving of the camera 10 may occur, so that useful image evaluation is no longer possible. As illustrated in FIG. 6, it is therefore expedient to vary the luminous intensity of the infrared source 12 cyclically between a plurality of predetermined values. Images in which the camera is overdriven or greatly underexposed can then be discarded, so that sufficiently many well-exposed images are always available for the evaluation and gesture recognition.

Figure 7:
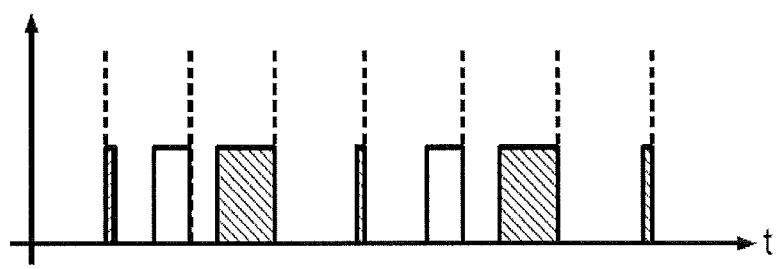
FIG. 7 shows a schematic representation of the adaptation of the exposure time of a camera to different light conditions.

This may be further reinforced by a cyclic variation of the exposure time of the camera 10, as shown in FIG. 7. The time is plotted on the longitudinal axis, each bar of the diagram symbolizing an exposure of the camera 10. Here again, incorrectly exposed images or image ranges are respectively discarded.

Besides adaptation to the strongly varying intensity of the light scattered back by the hand 14, this moreover makes it possible to minimize error sources due to incident ambient light, which may vary greatly in the motor vehicle.

Since both the configuration of the hand and its position in all spatial directions can now be acquired, these values may be stored for each recorded image. From the sequence of changes in these parameters, gestures of the driver can then be identified reliably with known image analysis methods.

All the analysis methods described may be improved by the use of a plurality of redundant cameras 10. This allows plausibilization of the values acquired by each individual camera 10, and optionally the exclusion of implausible recordings or evaluations. In this way, despite strong perturbing influences present in the motor vehicle, gestures can be reliably identified and used for the control.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:
1. A method for inputting a control command for a component of a motor vehicle, comprising:
   acquiring a calibration image for an input object, the calibration image being determined when the input object is at a predetermined position within a predetermined acquisition region, in order to calibrate a skeleton model to the input object;
   generating an image sequence for the input object, the image sequence being generated by imaging the input object within the acquisition region as the user guides the input object through the acquisition region, the input object being imaged by an imaging device comprising an infrared camera;
   illuminating the input object within the acquisition region using an infrared source so that infrared light from the infrared source is scattered by the input object back to the camera;
   identifying a position change of the input object based on the image sequence by:
      adapting a first image of the image sequence to the skeleton model using first parameters;
      adapting a second image of the image sequence to the skeleton model using second parameters; and
      comparing the first and second parameters;
   determining position information from a ratio between a size of the input object in the calibration image and a size of the input object in at least one image of the image sequence, and from a position of the input object along an axis parallel to a viewing direction of the camera determined based on a luminous intensity of the infrared light scattered back to the camera; and
   generating a control command for, and inputting the control command to, the component of the motor vehicle based on the position change and the position information,
wherein
a duration for which the camera is allowed to be exposed to the infrared light scattered back to the camera is varied cyclically by exposing the camera to the infrared light scattered back to the camera for a first period of time and exposing the camera to the infrared light scattered back to the camera for a second period of time which is greater than the first period of time.

2. The method as claimed in claim 1, wherein
coordinates of a point on the input object are acquired on a detector matrix of the camera, and
a position of the point on the input object in a plane perpendicular to a viewing direction of the camera is determined using the coordinates of the point on the detector matrix of the camera.

3. The method as claimed in claim 2, wherein
first and second infrared cameras are used to obtain the image sequence, and
the first and second infrared cameras have pixels and detector matrices that are positionally offset from one another.

4. The method as claimed in claim 1, wherein
there are two points on the input object that are separated by a known object distance, and
in images of the input object, the two points on the input object are separated by an image distance, and
the position of the input object along an axis parallel to a viewing direction of the camera is determined from a ratio of the image distance to the known object distance.

5. The method as claimed in claim 4, wherein
the position information determines an absolute distance of the input object from the imaging device along the axis parallel to the viewing direction and
the ratio of the image distance to the known object distance determines a distance change of the input object along the axis parallel to the viewing direction.

6. The method as claimed in claim 1, wherein an illumination power of the infrared source is varied cyclically between at least two predetermined power values.

7. The method as claimed in claim 1, wherein the duration for which the camera is allowed to be exposed to the infrared light scattered back to the camera is varied cyclically by exposing the camera to the infrared light scattered back to the camera for a third period of time which is greater than the first period of time and the second period of time.

8. The method as claimed in claim 1, wherein the motor vehicle has a vehicle-fixed object with a known position,
an image of the vehicle-fixed object is acquired by the infrared camera, and
a position of the input object relative to the vehicle-fixed object is determined based on the image of the vehicle-fixed object.

9. The method as claimed in claim 1, wherein the position change is identified and the position information is determined without stereoscopic image recognition.

10. The method as claimed in claim 1, wherein the skeleton model relates to a skeleton of a human hand.

11. The method as claimed in claim 10, wherein the first and second parameters relate to flexion angles of finger joints of the human hand.

12. The method as claimed in claim 1, wherein the calibration image is obtained in an initialization phase to determine a size of a hand of the user.

13. The method as claimed in claim 1, wherein the position change identifies movements in a hand of the user.

14. The method as claimed in claim 1, wherein the position information determines a distance of the input object from the imaging device.

15. The method as claimed in claim 1, wherein a single infrared camera is used as the imaging device.

16. The method as claimed in claim 1, wherein the position change and the position information identify how the user is interacting with the component of the motor vehicle.

17. A motor vehicle comprising:
an electronic apparatus; and
a gesture control device for acquiring an operating gesture of an input object in a passenger compartment of the motor vehicle, the gesture control device comprising:
an acquisition unit to acquire a calibration image for the input object, the calibration image being determined when the input object is at a predetermined position within the passenger compartment, in order to calibrate a skeleton model to the input object;
an imaging device comprising an infrared camera to generate an image sequence for the input object, by imaging the input object within the passenger compartment as the user guides the input object through the passenger compartment;
an infrared source to illuminate the input object within the passenger compartment so that infrared light from the infrared source is scattered by the input object back to the camera; and
a position change unit to identify a position change of the input object based on the image sequence by:
adapting a first image of the image sequence to the skeleton model using first parameters;
adapting a second image of the image sequence to the skeleton model using second parameters; and
comparing the first and second parameters;
a position information unit to determine position information from a ratio between a size of the input object in the calibration image and a size of the input object in at least one image of the image sequence, and from a position of the input object along an axis parallel to a viewing direction of the camera, the position being determined based on a luminous intensity of the infrared light scattered back to the camera; and
a command unit to generate a control command for, and input the control command to, the electronic device, based on the position change and the position information,
wherein
a duration for which the camera is allowed to be exposed to the infrared light scattered back to the camera is varied cyclically by exposing the camera to the infrared light scattered back to the camera for a first period of time and exposing the camera to the infrared light scattered back to the camera for a second period of time which is greater than the first period of time.

18. A method for inputting a control command for a component of a motor vehicle, comprising:
acquiring a calibration image for an input object, the calibration image being determined when the input object is at a predetermined position within a predetermined acquisition region, in order to calibrate a skeleton model to the input object;
generating an image sequence for the input object, the image sequence being generated by imaging the input object within the acquisition region as the user guides the input object through the acquisition region, the input object being imaged by an imaging device comprising an infrared camera;
illuminating the input object within the acquisition region using an infrared source so that infrared light from the infrared source is scattered by the input object back to the camera,
identifying a position change of the input object based on the image sequence by:
adapting a first image of the image sequence to the skeleton model using first parameters,
adapting a second image of the image sequence to the skeleton model using second parameters, and
comparing the first and second parameters;
determining position information from a ratio between a size of the input object in the calibration image and a size of the input object in at least one image of the image sequence, and from a position of the input object along an axis parallel to a viewing direction of the camera determined based on a luminous intensity of the infrared light scattered back to the camera; and
generating a control command for, and inputting the control command to, the component of the motor vehicle based on the position change and the position information,
wherein
a duration for which the camera is allowed to be exposed to the infrared light scattered back to the camera is varied cyclically by exposing the camera to the infrared light scattered back to the camera for a first period of time and exposing the camera to the infrared light scattered back to the camera for a second period of time which is greater than the first period of time,
a first infrared camera and a second infrared camera are used to obtain the image sequence, the first infrared camera has first pixels and a first detector matrix from which first two-dimensional coordinates of a first point on the input object in a plane perpendicular to a viewing direction of the first infrared camera are acquired, the second infrared camera has second pixels and a second detector matrix from which second two-dimensional coordinates of a second point on the input object in a plane perpendicular to a viewing direction of the second infrared camera are acquired, the second pixels and the second detector matrix of the second infrared camera partially overlap with and are positionally offset from the first pixels and the first detector matrix of the first infrared camera, and a two-dimensional coordinate position of the input object is determined using the first two-dimensional coordinates obtained by the first infrared camera and the second two-dimensional coordinates obtained by the second infrared camera.

19. The method as claimed in claim 1, wherein an illumination power of the infrared source is varied cyclically by using at least a first predetermined power setting greater than zero for a first period of time and a second predetermined power setting for a second period of time which is greater than the first predetermined power setting.

20. The method as claimed in claim 1, further comprising discarding images among the image sequence that are determined to be overly exposed and underexposed.

* * * * *